United States Patent [19]

Carpenter et al.

[11] Patent Number: 4,918,861
[45] Date of Patent: Apr. 24, 1990

[54] PLANT GROWTH BED WITH HIGH LOFT TEXTILE FIBERS

[75] Inventors: Tim D. Carpenter, Colorado Springs, Colo.; Claude C. Hobbs, Waco, Tex.

[73] Assignee: Hobbs Bonded Fibers, Groesbeck, Tex.

[21] Appl. No.: 271,729

[22] Filed: Nov. 15, 1988

[51] Int. Cl.[5] ............................................. A01G 31/00
[52] U.S. Cl. ...................................................... 47/59
[58] Field of Search ..................... 47/62, 79, 48.5, 59, 47/87

[56] References Cited

U.S. PATENT DOCUMENTS

| | | |
|---|---|---|
| 1,994,962 | 3/1935 | Rushfeldt et al. |
| 2,807,912 | 10/1957 | Bjorkstein ........................ 47/79 |
| 2,870,574 | 1/1959 | Sheridan ........................... 47/62 |
| 3,872,621 | 3/1975 | Greenbaum ....................... 47/59 |
| 3,961,444 | 6/1976 | Skaife . |
| 3,973,353 | 8/1976 | Dedolph ............................ 47/65 |
| 4,034,507 | 7/1977 | Dedolph . |
| 4,189,868 | 2/1980 | Tymchuck et al. |
| 4,292,760 | 10/1981 | Krave . |
| 4,292,761 | 10/1981 | Krave . |
| 4,400,910 | 8/1983 | Koudstaal et al. |
| 4,403,446 | 9/1983 | Wolfe et al. ....................... 47/62 |
| 4,424,645 | 1/1984 | Rannali . |
| 4,527,353 | 7/1985 | Newby ............................... 47/79 |
| 4,777,763 | 10/1988 | Shannon et al. .................. 47/87 |

Primary Examiner—David A. Scherbel
Assistant Examiner—Michele A. Van Patten
Attorney, Agent, or Firm—Bell, Seltzer, Park & Gibson

[57] ABSTRACT

A plant growth bed for growing plants includes a bag formed of a relatively thin plastic sheet material impervious to passage of liquids and air therethrough with a relatively high loft bedding of crimped textile fibers substantially filling the bag. The major portion of the crimped textile fibers are hydrophobic staple fibers and the remaining minor portion of the crimped textile fibers are hydrophilic fibers intermixed or blended together. The high loft of the textile fibers provides open spaces around the fibers to allow for optimum air for proper root development and plant growth. The bedding is readily compressible as for compact shipment to about 1/5 the thickness of the uncompressed high loft bedding. In an uncompressed condition the bedding has an overall thickness of at least about 3 inches and a density of 0.5 to 2 pounds per cubic foot. The bedding of fibers has the ability to retain amongst the fibers forming the bedding at least about four times its weight of a liquid.

10 Claims, 2 Drawing Sheets

PLANT GROWTH BED WITH HIGH LOFT TEXTILE FIBERS

FIELD OF THE INVENTION

This invention relates to a plant growth bed for growing plants and more particularly to a plant growth bed having a relatively high loft bedding of crimped textile fibers in a bag formed of relatively thin plastic sheet.

BACKGROUND OF THE INVENTION

It is common in various growing environments to use a growth bed other than dirt and soil. For example, it is recognized that acid or desert soils usually cannot sustain any appreciable growth. Also, many soils may adversely affect plant growth owing to such factors as nutrient depletion, chemical poisoning, improper pH adjustment, or even poor soil consistency. As a result, many green houses use a non-soil growth bed to obtain better pH control of growing conditions, ease handling of the growth bed since heavy soil is not used, provide an enhanced air and liquid permeability, and minimize harmful bacterial growth.

Many different varieties of growth beds have been produced and commercialized. For example, U.S. Pat. Nos. 4,292,760, and 4,292,761 to Krave disclose a porous, urethane substrate used as a bed for sprouting seeds. U.S. Pat. No. 4,424,645 to Rannali discloses the use of compressed peat pellets packaged in a flexible, rollable container to facilitate handling thereof as well as mineral wool fibers which are commonly sold in the trade under the name Rockwool. In addition, mixtures of mineral wool fibers with peat, and even dried peat and styrofoam beads having dry, pulverized fertilizer added therein have been used as a growth bed.

Inherent limitations of these growth beds have restricted their application. For example, a combination of peat and other products may provide a growth bed having sufficient nutrients and air-liquid permeability. Nevertheless, peat is nonhomogeneous, prone to harmful bacterial growth, and difficult to stabilize for pH adjustment. In addition, peat is cumbersome to transport even when dried and compressed within a container or grow receptacle of some type since the amount which the peat can be compressed is limited.

Mineral wool fibers, on the other hand, provide a growth bed which possesses acceptable air and fluid permeability which makes it practical for insertion into a plastic bag, which commonly is referred to in the trade as a "grow bag." Holes can be punched in the bag and the roots of a plant or a plant positioned in a block of urethane or soil inserted therein. To sustain growth, nutrient laden water and sometimes bacterial growth inhibitors or other plant growth stimulators are added.

As compared to growth beds of peat or combinations of peat, soil, urethane or other growth bed materials, mineral wool fibers are homogenous and can be added to a "grow bag" in measured amounts for providing an established density and volume which aids in maintaining a constant air and fluid permeability. However, even with these benefits, the use of mineral wool fibers as a growth bed are limited. Mineral wool fibers do not "wick" water adequately and currently the use of such fibers has become the subject of health concerns. Also, these fibers are heavy and cannot be compressed to facilitate shipping and handling. This makes transport particularly to those overseas countries which have a need for alternative growth beds costly, burdensome and impractical.

It is accordingly an object of the present invention to provide a growth bed formed from a bedding of crimped textile fibers which retains high loft to provide open spaces around the fibers to allow for optimum air for proper root development and plant growth.

It is a further object of this invention to provide a growth bed which is readily compressible as for compact shipment.

It is another object of this invention to provide a growth bed which adequately receives and retains water throughout.

Further and more specific objects and advantages of the invention will become apparent as the description proceeds.

SUMMARY OF THE INVENTION

These and other objects and advantages of the present invention are accomplished by a plant growth bed for growing plants where a bag formed of a relatively thin plastic sheet material impervious to passage of liquids and air therethrough includes therein a relatively high loft bedding of crimped textile fibers. Some of the crimped textile fibers are hydrophobic synthetic staple fibers and the remaining portion of the crimped fibers are hydrophilic staple fibers. The hydrophobic and hydrophilic fibers are intermixed or blended together throughout the bedding and the relatively high loft bedding provides open spaces around the crimped fibers to allow for optimum air for proper root development and plant growth. The bedding of textile fibers substantially fills the bag to thereby substantially prevent the bedding from undesirably shifting about within the bag. When not compressed, the high loft bedding has an overall thickness of at least about 3 inches and a density of 0.5 to 2 pounds per cubic foot. The bedding is readily compressible, as for compact shipment, to about 1/5 the thickness of the uncompressed high loft bedding. The bedding of crimped textile fibers has the ability to receive and retain amongst the textile fibers forming the bedding at least about four times its weight of a liquid.

In the preferred embodiment the plastic sheet material is of a composite construction and comprises an outer light reflective layer formed of a light color and an inner layer formed of a dark color to prevent light from going to the roots of plants and to prohibit undesirable algae growth. The bag also is of generally rectangular configuration and has a width within the range of about 6"–10" and a length within the range of about 24"–48". The plastic sheet material forming the plastic bag is about 4–5 mils in thickness.

BRIEF DESCRIPTION OF THE DRAWINGS

Some of the objects and advantages of this invention having been set forth above, other objects and advantages will appear as the description proceeds, when taken in conjunction with the companying drawings in which.

DETAILED DESCRIPTION OF THE PREFERRED EMBODIMENT

Figure 1:
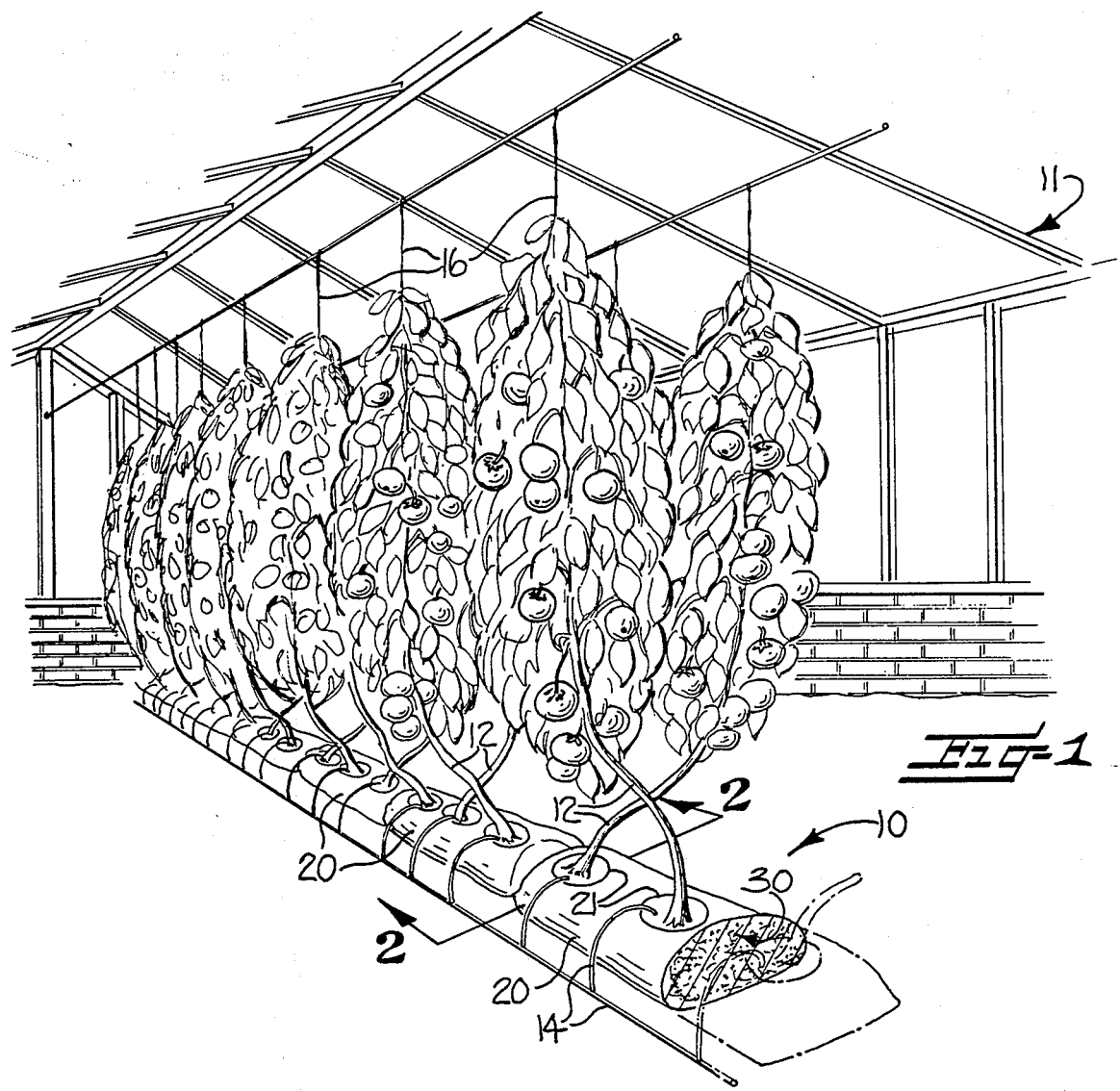
FIG 1 an isometric view of a portion of a green house interior showing the use of plant growth beds in accordance with the invention.
Figure 4:
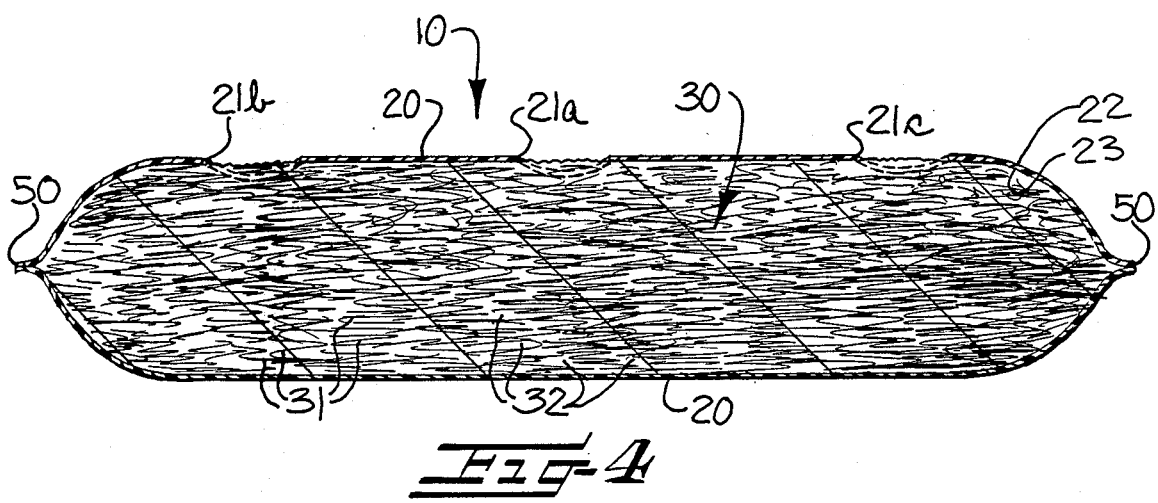
FIG. 4 a sectional view of the plant growth bed of FIG. 3 taken along 4—4.

Referring more particularly to the drawings and FIG. 1, there are shown a number of plant growth beds 10 in accordance with the present invention which ar placed end-to-end in a conventional green house 11. As will be explained in detail later, each growth bed 10 is made from a substantially close-ended bag 20 formed of a relatively thin plastic sheet material which is impervious to the passage of liquids and air therethrough. A relatively high loft bedding 30 of crimped textile fibers 31 substantially fills the bag 20 (FIGS. 1 and 4). The crimped textile fibers 31 provide open spaces 32 around the fibers to allow for optimum air for proper root development and plant growth.

Figure 2:
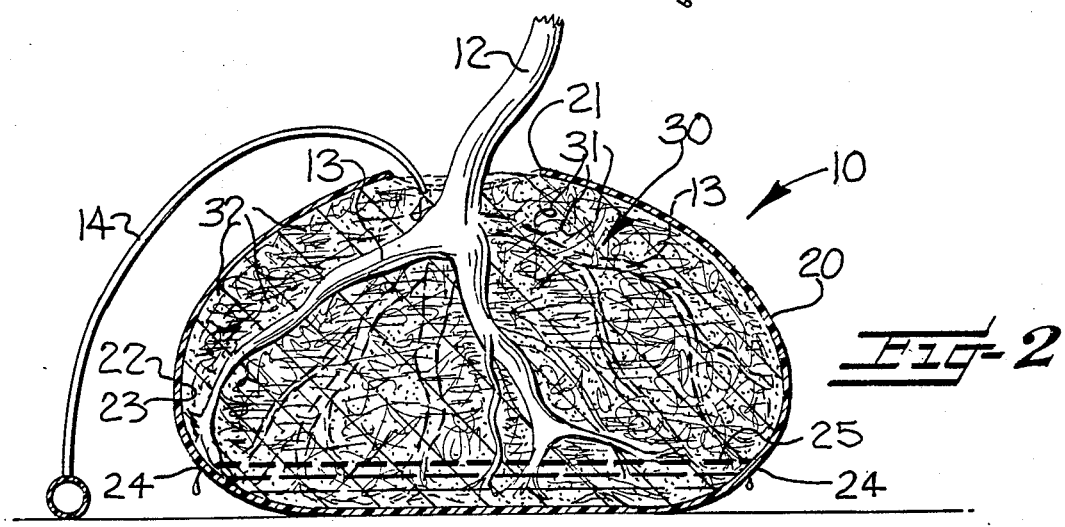
FIG. 2 is a sectional view of the plant growth bed taken along line 2—2 of FIG. 1.

As illustrated, each bag 20 supports a number of plants 12 for growth, which in the illustrated embodiment are seen as tomato plants. The plants' root systems 13 are supported by the high loft bedding 30 where the root systems 13 of each plant 12 grow and extend through the open spaces 32 around the crimped textile fibers 31 (FIG. 2). Cut holes 21 located on the top of the plastic bag 20 allow for initial insertion of a plant 12 as well as the subsequent addition to the growth bed 10 of nutrient-laden water by manual means or by means of a conventional tubular emitter 14 which is timed to inject nutrient-laden water through the hole into the high loft bedding 30 at fixed intervals.

Although the high loft bedding 30 provides an adequate substrate to support the growth of plants 12 and their root systems 13, larger plants such as the mature tomato plants illustrated in FIG. 1 typically must have additional means supporting the vertical growth of the plant to prevent the plant from falling. As is conventional, an overhead support structure in the form of suitably supported cordage 16 aids in maintaining the plants in an upright position.

Referring more particularly to FIG. 2, there is shown in detail a section of the growth bed 10 illustrated in FIG. 1. The plastic sheet material forming the plastic bag 20 is about 4–5 mils in thickness, thus giving the bag sufficient flexibility to aid in handling and as will be explained later, allowing compression of the bag for compact shipment. Preferably, the plastic sheet material is of composite construction and includes an outer light reflective layer 22 formed of a light color such as white or silver to reflect light from the growth bed 10 and minimize heat build-up therein. The inner layer 23 is formed of a dark color to prevent light from going to the roots of plants and to prohibit undesirable algae growth.

In the preferred embodiment, the bag 20 is formed of a tubular extruded plastic film material, which, as will be explained later, facilitates insertion of the high loft bedding 30 of crimped textile fibers 31 therein. As illustrated, drainage holes 24 are cut in the sides of the bag 20 to minimize the amount of water contained in the bag. Excess water will cause the oxygen in the growth bed to be depleted and the plant root systems 13 will die. Typically, the bag 20 can be filled safely to approximately 10% of its capacity with water 25.

Figure 3:
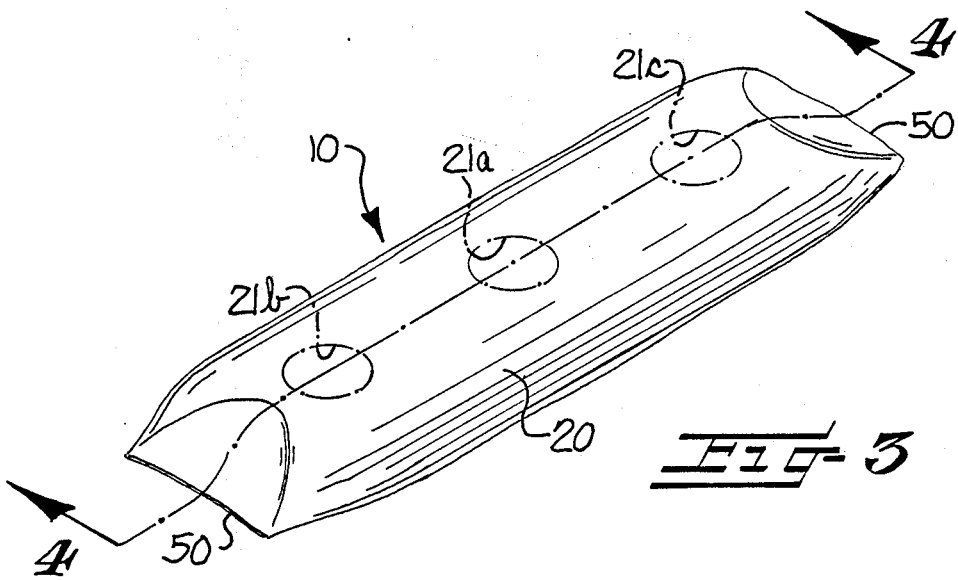
FIG. 3 an isometric view of one plant growth bed in accordance with the invention.

Each bag 20 when filled forms a growth bed 10 which is of generally rectangular configuration and is approximately 24–48" long, 6–10" wide and at least 3" in height. Preferably, the growth bed is approximately 36" long, 8" wide, and 4" in height. The tubular extruded plastic sheet material is cut to the desired length and then heat sealed after having the high loft bedding 30 of crimped textile fibers 31 inserted therein. Use of bags 20 longer than 36" is not preferred since shorter bags are easier to handle and the use of shorter bags minimizes the spread of disease among plants. If a single bag many feet long were utilized, a disease in one plant easily could be transferred to adjacent plants growing from the same bag. As best illustrated in FIGS. 1 and 3, a 36" long bag is suitable for growth of three plants. A first hole 21a is cut into the bag 20 at a medial location evenly spaced from its ends, and a second 21b and third 21c hole each cut twelve inches from the center hole giving space for three plants twelve inches apart with end plants six inches from the ends. When the bags are placed end-to-end, adjacent end plants will be positioned twelve inches apart (FIG. 1). Each bag 20 also is at least three inches thick and in the preferred embodiment is approximately four to five inches thick when filled with the high loft bedding 30 of crimped textile fibers 31. Thicknesses less than 3" do not provide the necessary depth of high loft bedding 30 sufficient to sustain plant root growth. Any high loft bedding thickness greater than 5" is not needed and therefore use of the excess bedding is uneconomical and wasteful.

The plant growth bed 10 in accordance with the present invention has a high loft bedding 30 of crimped textile fibers 31 suitably adapted as a growth bed when inserted into the bag. Most of the high loft bedding is formed from hydrophobic synthetic staple fibers, which in the preferred embodiment are polyester staple fibers having a staple length within the range of $1\frac{1}{2}$" to 3". The remaining portion of the crimped textile fibers 31 are hydrophilic staple fibers, which in the preferred embodiment are a polyester-cotton blend.

The presence of a majority of polyester crimped textile fibers gives the bedding 30 memory and recoverability so as to maintain the high loft of the bedding. Without this memory or recoverability, the bedding 30 would not maintain its high loft characteristic which is essential in order to provide the necessary open spaces 32 around the crimped textile fibers to allow for optimum air for proper root development. For example, the normal handling of the growth bed 10 in a green house 11, especially when the bedding is wet, would cause the bedding to lose its high loft characteristics. This problem is alleviated by the nature of the bedding 30 having a majority of crimped hydrophobic polyester synthetic staple fibers which cause the bedding to retain its high loft. Also, as will be explained later, recoverability is necessary should the growth bed be compressed, as for compact shipment.

Although the crimped hydrophobic polyester synthetic staple fibers impart a high degree of recoverability to the high loft bedding 30, those fibers alone also have been found insufficient as an optimum bedding for use in the plant growth bed. The hydrophobic polyester fibers do not wick a sufficient amount of water 25 which is necessary to sustain plant root growth. Also, typically the crimped polyester fibers are so intertwined that separation of the fibers to make a depression in the bedding 30 for insertion of a plant root system 13 is difficult. Although a small denier fiber, i.e. less than 15 denier, together with a wetting agent to coat the fibers 31 and cause the water 25 to spread out on the fiber instead of beading could be used to increase the wicking action of the bedding 30, this approach has been found unacceptable. The use of a wetting agent increases the overall cost of the growth bed 10 and creates an additional concern of a grower as to what amount of wetting agent is to be applied.

It has been found that the addition of a minor portion of hydrophilic staple fiber to the major portion of the hydrophobic fibers not only provides an increased wicking action to the textile fibers 31 to enhance liquid retention, but also the minor addition facilitates the separation of the textile fibers to make a depression in the bedding for insertion of the plant root system 13 therein. Preferably, 90% of the textile fibers forming the high loft bedding 30 are polyester hydrophobic fibers. The remaining ten percent can be a cotton or polyester-cotton blend, with the preferred embodiment having a polyester-cotton blend of 60% cotton by weight and a denier similar to the denier of the hydrophobic fibers, i.e. 15. Typically, the hydrophilic fibers will have a shorter staple length than the hydrophobic fibers since cotton fibers are found in shorter staple lengths than the desired polyester staple length of 1½" to 3".

The low percentage of cotton, i.e. 6–10% by weight, is sufficient to increase the wicking action of the textile fibers 31 forming the high loft bedding 30 of the growth bed 10 as well as facilitate separation of the fibers to form a depression thereat. This high loft bedding 30 formed by the combination of polyester hydrophobic fibers and cotton or polyester-cotton blend hydrophilic fibers has the ability to receive and retain amongst the textile fibers 31 forming the bedding at least about four times its weight of a liquid. Any larger percentage of cotton would be detrimental. Cotton fibers decrease the recoverability of the high loft bedding 30, especially when cotton fibers are wetted. If a larger percentage of cotton fibers were used, the high loft bedding 30 would sag, thus reducing the open spaces 32 around the fibers and minimizing the optimum air volume in the bedding. Also, during shipment, if the plant growth bed 10 were compressed to a fraction of its volume, the potential for the growth bed to recover back to its original size would be lessened. Finally, cotton fibers reduce the potential to maintain within the growth bed 10 a constant pH.

When the plastic bag 20 is filled with the high loft bedding 30 of crimped hydrophobic and hydrophilic textile fibers 31 in an uncompressed condition, the high loft bedding 30 has a density of around 0.5 to 2 pounds per cubic foot depending on the fiber denier size, the proportion of hydrophobic and hydrophilic fibers used, the staple length and the yarn characteristics imparted during yarn processing.

To sustain plant root growth, a minimum of 3" of high loft bedding in an uncompressed condition is needed, and typically 4" to 5" is actually used. A number of methods can be used to first, prepare the high loft bedding 30, and then, second, insert the bedding into a tubular extruded bag. The quickest method is blowing an intermixture or blend of the hydrophilic and hydrophobic fibers either into a bag 20 having one end sealed and then sealing the other end once the fibers are blown therein, or air blowing staple fibers into a loose high loft bed and then inserting the bed into a bag. If a stronger high loft bedding is desired, a formed bed of desired thickness can be produced from cross-lapping off a conventional garnet or carding machine. The bed is then slit to the desired length and width corresponding to the dimensions of the bag when filled. No matter what method is used, however, the high loft bedding 30 of textile fibers 31 is inserted within the bag 20 so as to substantially fill the bag 20 to substantially prevent the high loft bedding 30 from undesirably shifting about within the bag (FIG. 4). Alternatively, the high loft bedding 30 can be inserted into an elongate tube which is subsequently compressed and rolled into a convolute spiral. The tube could be segmentalized into individual growth beds 10. As the convolute spiral is unwound, individual growth beds 10 are removed. Although some growers may prefer to obtain a number of growth beds convolutely wound in a spiral, such a method may be economically unfeasible or unacceptable to many other growers.

Figure 5:
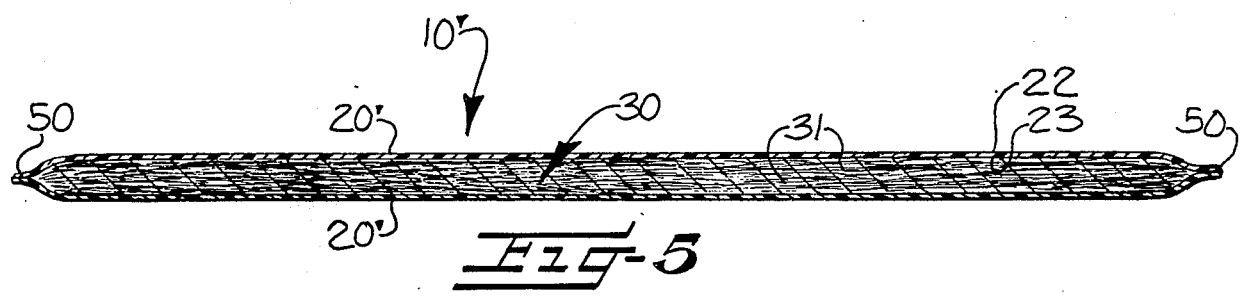
FIG. 5 a sectional view of a plant growth bed which has been compressed and sealed in an air tight manner to retain its compressed configuration for facilitating compact shipment.

One key aspect of the plant growth bed 10 in accordance with the present invention is its ready compressibility, as for compact shipment. Before the bag ends 50 are sealed, the bag and high loft bedding can be compressed, removing most of the air from the bag. The ends 50 can then be heat sealed in an air-tight manner so that the growth bed remains in a compressed state. Typically the growth bed can be compressed up to 1/5 the thickness of the uncompressed high loft bedding (FIGS. 4 and 5). Once compressed, a number of the compressed growth beds 10, can be stacked into a box for shipment to a domestic or overseas location.

The compressed growth bed 10, quickly can be prepared for use by breaking the air-tight seal of the bag 20'. Almost simultaneously with breaking of the air-tight seal, the compressed growth bed 10' expands almost five times its compressed volume to its fully uncompressed volume. Although any minor slit in the bag 20' could be made to break the air-tight seal, a rotating circular hole saw is preferred since the holes 21 for plant insertion within the bag also can be produced by utilizing a hole saw having a diameter corresponding to the hole diameter desired for the growth bed, which in the preferred embodiment is approximately 2"–3" in diameter. Conceivably, x-shaped slits could be cut into the place where the holes 21 are cut. However, it is more desirable to have open holes 21 instead of the narrow slits since a hole facilitates insertion of a plant and nutrient-laden water as compared with a slit where the formed plastic flaps must be pulled away to form an opening thereat.

Once a hole 21 is cut in the bag 20, the intertwined textile staple fibers 31 underlying the hole are separated to form a slight depression thereat. Typically, only a 2" to 2½" depression is needed. The plant root system of a small plant is then inserted into the formed depressions. As the plant grows, the root system 13 intertwines with the textile fibers 31 and grows through the open spaces 32 around the crimped fibers to allow for optimum air for proper root development.

Alternatively, a growing block (not shown) or other potted container which allows plant roots to grow therethrough can be placed directly on top of the high loft bedding 30 without forming a depression thereat. As the plant grows, the root systems 13 will grow into the high loft bedding 30. This method is advantageous. Once the plant has grown, the growing block or potted container can be removed by cutting the block or pot from off the top of the bedding 30 or by twisting and pulling it out. Typically, the growth bed 10 can be used again.

The foregoing embodiment is to be considered illustrative rather than restrictive of the invention and these modiications which come within the meaning and range of equivalents of the claims are to be included therein.

That which is claimed is:

1. A plant growth bed for growing plants comprising a substantially close-ended bag formed of a relatively thin plastic material impervious to passage of liquids and air therethrough, and a relatively high loft bedding of crimped textile fibers in said bag, the major portion of said crimped textile fibers being hydrophobic synthetic staple fibers, the remaining minor portion of said crimped fibers being hydrophilic staple fibers for enhancing liquid retention, said hydrophobic and hydrophilic fibers being blended together through the bedding and being unconnected to each other so as to permit readily forming a hole in the bedding for reception of a transplanted plant, said relatively high loft bedding of crimped textile fibers providing open spaces around the crimped fibers to allow for optimum air for proper root development and plant growth, said bedding of textile fibers substantially filling the bag to thereby substantially prevent the bedding from undesirably shifting about with the bag, said high loft bedding when not compressed having an overall thickness of at least about 3 inches and density of 0.5 to 2 pounds per cubic foot, and said bedding being readily compressible, as for compact shipment, to bout 1/5 the thickness of the uncompressed high loft bedding and to readily return to a high loft state upon the release of a compressive force thereon.

2. A plant growth bed as claimed in claim 1 wherein said plastic sheet material is of composite construction and comprises an outer light reflective layer formed of a light color and an inner layer formed of a dark color to prevent light from going to the roots of plants and to prohibit undesirable algae growth.

3. The plant growth bed as claimed in claim 1 wherein said bag is of generally rectangular configuration and has a width within the range of about 6″–10″ and a length within the range of about 24″–48″.

4. The plant growth bed as claimed in claim 1 wherein the plastic sheet material forming the plastic bag is about 4–5 mils in thickness.

5. The plant growth bed as claimed in claim 1 wherein said hydrophobic fibers have a staple length within the range of 1½″to 3″, and wherein the hydrophilic fibers have a shorter staple length than said hydrophobic fibers.

6. The plant growth bed as claimed in claim 1 wherein said hydrophobic fibers comprise polyester fibers and said hydrophilic fibers comprise cotton fibers.

7. The plant growth bed as claimed in claim 1 wherein at least 90% of said textile fibers are hydrophobic fibers.

8. The plant growth bed as claimed in claim 1 wherein said bag is formed of tubular extruded plastic film material.

9. A plant bed growth for growing plants comprising a substantially close-ended bag formed of a relatively thin plastic sheet material impervious to passage of liquids and air therethrough, and a relatively high loft bedding of crimped textile fibers in said bag, the major portion of said crimped textile fibers being hydrophobic synthetic staple fibers, the remaining minor portion of said crimped fibers being hydrophilic staple fibers for enhancing liquid retention, said hydrophobic and hydrophilic fibers being blended together throughout the bedding and being unconnected to each other so as to permit readily forming a hole in the bedding for reception of a transplanted plant, said relatively high loft bedding of crimped textile fibers providing open spaces around the crimped fibers to allow for optimum air for proper root development and plant growth, said bedding of textile fibers substantially filling the bag to thereby substantially prevent the bedding from undesirably shifting about within the bag, said high loft bedding when not compressed having an overall thickness of at least about 3 inches and a density of 0.5 to 2 pounds per cubic foot, said bedding being readily compressible, as for compact shipment, to about 1/5 the thickness of the uncompressed high loft bedding and to readily return to a high loft state upon the release of a compressive force thereon, and wherein said bedding of hydrophobic and hydrophilic crimped textile fibers has the ability to receive and retain amongst the textile fibers forming the bedding at least about four times its weight of a liquid.

10. A plant growth bed for growing plants comprising a substantially close-ended bag formed of a relatively thin plastic sheet material impervious to passage of liquids and air therethrough, said plastic sheet material being of composite construction and comprising an outer light reflective layer formed of a light color and an inner layer formed of a dark color to prevent light from going to the roots of plants and to prohibit undesirable algae growth, and a relatively high loft bedding of crimped synthetic textile fibers in said bag, the major portion of said crimped textile fibers being hydrophobic synthetic staple fibers, the remaining minor portion of said crimped fibers being hydrophilic staple fibers, said hydrophobic and hydrophilic fibers being blended together throughout the bedding and being unconnected to each other so as to permit readily forming a hole in the bedding for reception of a transplanted plant, said relatively high loft bedding of textile fibers providing open spaces around the crimped fibers to allow for optimum air for proper root development and plant growth, said bedding of textile fibers substantially filling the bag to thereby substantially prevent the bedding from undesirably shifting about within the bag, said high loft bedding when not compressed having an overall thickness of at least about 3 inches and a density of 0.5 to 2 pounds per cubic foot, said bedding being readily compressible, as for compact shipment, to about 1/5 the thickness of the uncompressed high loft bedding, and to readily return to a high loft state upon the release of a compressive force thereon, and wherein said bedding of hydrophobic and hydrophilic crimped textile fibers has the ability to receive and retain amongst the textile fibers forming the bedding at least about four times its weight of a liquid.

* * * * *

UNITED STATES PATENT AND TRADEMARK OFFICE
CERTIFICATE OF CORRECTION

PATENT NO. : 4,918,861
DATED : April 24, 1990
INVENTOR(S) : Carpenter et al

It is certified that error appears in the above-identified patent and that said Letters Patent is hereby corrected as shown below:

Column 2, line 64, after "the", insert -- present --

Column 7, line 15, delete "through", insert -- throughout --

Column 7, line 24, delete "with", insert -- within --

Column 7, line 28, delete "bout", insert -- about --

Signed and Sealed this

Tenth Day of September, 1991

Attest:

HARRY F. MANBECK, JR.

Attesting Officer

Commissioner of Patents and Trademarks